(12) United States Patent
Kamitani et al.

(10) Patent No.: US 10,800,701 B2
(45) Date of Patent: Oct. 13, 2020

(54) RAPID-HARDENING CEMENT COMPOSITION

(71) Applicant: MITSUBISHI MATERIALS CORPORATION, Chiyoda-ku (JP)

(72) Inventors: Kiyoshi Kamitani, Chichibu-gun (JP); Keiji Saitou, Chichibu-gun (JP); Kenji Tokunaga, Tokyo (JP); Hideo Tawara, Tokyo (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 103 days.

(21) Appl. No.: 16/084,755

(22) PCT Filed: Mar. 31, 2017

(86) PCT No.: PCT/JP2017/013555
§ 371 (c)(1),
(2) Date: Sep. 13, 2018

(87) PCT Pub. No.: WO2017/170992
PCT Pub. Date: Oct. 5, 2017

(65) Prior Publication Data
US 2019/0077707 A1    Mar. 14, 2019

(30) Foreign Application Priority Data

Mar. 31, 2016 (JP) ................. 2016-073198
Mar. 27, 2017 (JP) ................. 2017-061377

(51) Int. Cl.
| | | |
|---|---|---|
| C04B 14/30 | (2006.01) | |
| C04B 40/00 | (2006.01) | |
| C04B 28/06 | (2006.01) | |
| C04B 28/16 | (2006.01) | |
| C04B 14/28 | (2006.01) | |
| C04B 16/06 | (2006.01) | |
| C04B 18/08 | (2006.01) | |
| C04B 18/10 | (2006.01) | |
| C04B 14/02 | (2006.01) | |
| C04B 14/46 | (2006.01) | |
| C04B 20/00 | (2006.01) | |
| C04B 28/04 | (2006.01) | |
| C04B 111/70 | (2006.01) | |
| C04B 103/44 | (2006.01) | |

(52) U.S. Cl.
CPC .......... *C04B 14/303* (2013.01); *C04B 14/022* (2013.01); *C04B 14/28* (2013.01); *C04B 14/4631* (2013.01); *C04B 16/06* (2013.01); *C04B 18/08* (2013.01); *C04B 18/10* (2013.01); *C04B 20/008* (2013.01); *C04B 28/04* (2013.01); *C04B 28/06* (2013.01); *C04B 28/16* (2013.01); *C04B 40/0042* (2013.01); *C04B 2103/44* (2013.01); *C04B 2111/70* (2013.01); *C04B 2201/05* (2013.01); *Y02W 30/92* (2015.05); *Y02W 30/94* (2015.05)

(58) Field of Classification Search
CPC ..... C04B 14/28; C04B 14/022; C04B 14/303; C04B 14/4631; C04B 16/06; C04B 18/08; C04B 18/10; C04B 20/008; C04B 28/04; C04B 28/06; C04B 28/16; C04B 40/0042; C04B 2103/44; C04B 2111/70; C04B 2201/05
See application file for complete search history.

(56) References Cited

U.S. PATENT DOCUMENTS 8,950,928 B2 * 2/2015 Nakashima ............. C04B 28/02
106/278

FOREIGN PATENT DOCUMENTS

| CN | 1771210 | A | 5/2006 |
|---|---|---|---|
| CN | 101041569 | A | 9/2007 |
| CN | 101258115 | A | 9/2008 |
| CN | 101928120 | A | 12/2010 |
| CN | 103253901 | A | 8/2013 |
| CN | 103408273 | A | 11/2013 |
| CN | 103771809 | A | 5/2014 |
| CN | 103922633 | A | 7/2014 |
| CN | 105246853 | A | 1/2016 |
| JP | 3-41420 | B2 | 6/1991 |
| JP | 7-215751 | A | 8/1995 |
| JP | 8-310846 | A | 11/1996 |

(Continued)

OTHER PUBLICATIONS

International Search Report dated Jun. 27, 2017, in PCT/JP2017/013555, filed Mar. 31, 2017.
International Search Report dated Jun. 27, 2017, in PCT/JP2017/013613, filed Mar. 31, 2017.
Office Action dated Jul. 17, 2020, in Chinese Patent Application No. 201780009812.4 filed Mar. 31, 2017 (with English translation).
Edited by Zhang Yuzhen, production and application of China aluminate cement, pp. 193-194, Beijing: China building materials Industrial Press (Jan. 2014).

(Continued)

*Primary Examiner* — Anthony J Green
(74) *Attorney, Agent, or Firm* — Oblon, McClelland, Maier & Neustadt, L.L.P.

(57) ABSTRACT

This rapid-hardening cement composition includes: a rapid-hardening admixture; and cement in an amount of 100 parts by mass to 2,000 parts by mass with respect to 100 parts by mass of the rapid-hardening admixture, wherein the rapid-hardening admixture is a composition that contains: calcium aluminate; inorganic sulfate in an amount of 50 parts by mass to 200 parts by mass with respect to 100 parts by mass of the calcium aluminate; and a setting modifier in an amount of 0.1 parts by mass to 10 parts by mass with respect to 100 parts by mass of the calcium aluminate, and an average particle diameter of the calcium aluminate is in a range of 8 μm to 100 μm, and an average particle diameter of the setting modifier is in a range of 5 μm or less.

20 Claims, 2 Drawing Sheets

(56) References Cited

FOREIGN PATENT DOCUMENTS

| JP | 2000-281410 A | | 10/2000 | | |
| JP | 2007320835 A | * | 12/2007 | ............. | C04B 28/06 |
| JP | 2008-273762 A | | 11/2008 | | |
| JP | 2008-274580 A | | 11/2008 | | |
| JP | 2012121763 A | * | 6/2012 | ............. | C04B 22/08 |
| JP | 2014111516 A | * | 6/2014 | ............. | C04B 22/08 |
| JP | 2014181165 A | * | 9/2014 | ............. | C04B 22/08 |
| JP | 2015-120624 A | | 7/2015 | | |
| WO | 93/08135 A1 | | 4/1993 | | |

OTHER PUBLICATIONS

Shuai Changhong, editor in chief, practical manual for safety operation procedures and Troubleshooting of construction machinery, pp. 1517-1518, Beijing: earthquake publish house (Mar. 2003).

* cited by examiner

RAPID-HARDENING CEMENT COMPOSITION

TECHNICAL FIELD

The present invention relates to a rapid-hardening cement composition, in particular, a rapid-hardening cement composition useful as an injection grout for pavement.

The present application claims priority on Japanese Patent Application No. 2016-73198 filed on Mar. 31, 2016, and Japanese Patent Application No. 2017-61377 filed on Mar. 27, 2017, the contents of which are incorporated herein by reference.

BACKGROUND ART

As methods for constructing pavements of roads, port facilities, airport runways, and the like, methods utilizing a PC pavement and a RC pavement are known. The PC pavement is a pavement in which a prestressed concrete (PC) pavement boards are disposed on a roadbed and a backfilling grout material is injected into a gap between the PC pavement hoards and the roadbed. The RC pavement is a pavement in which a reinforced concrete (RC) pavement board is used in place of the PC pavement board.

Further, as a pavement for heavy traffic roads, a semi-flexible pavement is known. The semi-flexible pavement is a pavement in which cement milk is injected into an open-graded asphalt mixture having a large porosity.

An injection grout for pavement, which is used as a raw material for a hack-filling grout material used for the PC pavement and the RC pavement, cement milk used for the semi-flexible pavement, and the like, is a composition containing cement. The cement composition to be used as the injection grout for pavement is usually a rapid-hardening cement composition in which a rapid-hardening admixture is contained to harden the cement at an early stage so that work is done at night and a road is opened to traffic next morning.

As the rapid-hardening admixture of the rapid-hardening cement composition, an admixture in which calcium aluminate and inorganic sulfate are combined (blended) is known. However, there have been problems that this rapid-hardening admixture in which calcium aluminate and inorganic sulfate are combined has a strong action of accelerating hardening of the cement, and, in the cement composition containing this rapid-hardening admixture, a time (setting initial time) from addition of water until the cement starts to set is short so that sufficient pot life cannot be secured. For this reason, in an admixture in which calcium aluminate and inorganic sulfate are combined, a setting modifier is added so as to regulate (control) the setting initial time of the cement composition. As the setting modifier, inorganic carbonate, oxycarboxylic acid, or sodium aluminate is used.

Patent Document 1 discloses an ultra-rapid-hardening cement composition which contains a quick-hardening cement as a main component, and the quick-hardening cement contains 15 to 35% by weight of a quick-hardening component in which a weight ratio of calcium aluminate: inorganic sulfate is 1:0.5 to 1:3, and the ultra-rapid-hardening cement composition contains, in terms of internal proportion of weight, 0.2 to 3% of sodium aluminate, 0.2 to 5% of inorganic carbonate, and 0.1 to 2% of oxycarboxylic acids.

Patent Document 2 discloses an injection grout for pavement which contains a rapid-hardening admixture, a cement mineral, sand, and a powdered emulsion. This Patent Document 2 discloses that sodium aluminate, inorganic carbonate, and carboxylic acids are used as setting modifiers of the rapid-hardening admixture, and these setting modifiers have a particle size constitution including 10 to 45% by mass of first particles having an average particle diameter of greater than 45 µm and equal to or less than 90 µm, 30 to 70% by mass of second particles having an average particle diameter of greater than 90 µm and equal to or less than 150 µm, and 5 to 30% by mass of third particles having an average particle diameter of greater than 150 µm and equal to or less than 500 µm, in which the second particles are included in an amount which is larger than the amount of the first particles and also larger than the amount of the third particles.

It is required that a rapid-hardening cement composition containing a rapid-hardening admixture can stably and sufficiently secure a pot life, that is, a setting initial time is stable and long, and fluidity is high during a period from addition of water until hardening reaction proceeds. In addition, after completion of construction work, it is required that hardening occurs at an early stage and high strength (compression strength) is developed, that is, excellent properties of early age strength are exhibited.

However, in the ultra-rapid-hardening cement composition disclosed in Patent Document 1, there have been problems that it is difficult to secure a long pot life as long as 60 minutes without reducing the compression strength at an early age (about 3 hours of age), and spots are observed on a hardened body of the cement composition and these parts become defects, and thereby causing a decrease in long-term strength. In addition, there was a problem in that the setting time greatly varies depending on an environmental temperature, and thereby resulting in poor workability at a construction site.

Further, in the injection grout for pavement disclosed in Patent Document 2, by specifying the particle size constitution of the setting modifiers contained in the rapid-hardening admixture, the properties of early age strength and the environmental temperature dependent properties of the setting time are improved. However, in the case where the injection grout for pavement disclosed in Patent Document 2 in which the rapid-hardening admixture is mixed is stored for about 3 months, the setting time may be greatly changed as compared with the setting time immediately after production and the properties of early age strength may be decreased.

PRIOR ART DOCUMENTS

Patent Documents

Patent Document 1: Japanese Examined Patent Application, Second Publication No. H3-41420
Patent Document 2: Japanese Unexamined Patent Application, First Publication No. 2008-274580

DISCLOSURE OF THE INVENTION

Problems to be Solved by the Invention

The present invention has been made in view of the above circumstances, and an object of the present invention is to provide a rapid-hardening cement composition in which variations in setting initial time due to an environmental temperature are small, variations in setting initial time are small even in the case of being stored for a long period of time, fluidity is high during a period from addition of water until hardening reaction proceeds, and the properties of early age strength are excellent.

Solutions for Solving the Problems

In order to solve the above problems, the present inventors have made intensive studies, and, as a result, they have found that it is effective to add a rapid-hardening admixture to a predetermined amount of cement, and the rapid-hardening admixture is a composition containing calcium aluminate, inorganic sulfate, and a setting modifier (for example, one or more of inorganic carbonates, oxycarboxylic acids, sodium aluminate, and sodium sulfate) at predetermined ratios, in which an average particle diameter of the calcium aluminate is in a range of 8 μm to 100 μm and an average particle diameter of the setting modifier is in a range of 5 μm or less. That is, for the rapid-hardening cement composition containing a predetermined amount of the cement with respect to the above-mentioned rapid-hardening admixture, it has been found that variations in setting initial time due to an environmental temperature are even smaller, variations in setting initial time even in the case of being stored for a longer period are small, fluidity is high during a period from addition of water until hardening reaction proceeds, and properties of early age strength are excellent. In addition, it has been found that, by mixing and grinding a clinker consisting of calcium aluminate and a setting modifier, it is possible to obtain the calcium aluminate and the setting modifier having the above-mentioned average particle diameters.

The present invention has been made on the basis of the above findings, and a rapid-hardening cement composition according to an aspect of the present invention includes: a rapid-hardening admixture; and cement in an amount of 100 parts by mass to 2,000 parts by mass with respect to 100 parts by mass of the rapid-hardening admixture, wherein the rapid-hardening admixture is a composition that contains: calcium aluminate; inorganic sulfate in an amount of 50 parts by mass to 200 parts by mass with respect to 100 parts by mass of the calcium aluminate; and a setting modifier in an amount of 0.1 parts by mass to 10 parts by mass with respect to 100 parts by mass of the calcium aluminate, and an average particle diameter of the calcium aluminate is in a range of 8 μm to 100 μm, and an average particle diameter of the setting modifier is in a range of 5 μm or less.

According to the rapid-hardening cement composition of the aspect of the present invention, the setting modifier contained in the rapid-hardening admixture has an average particle diameter of 5 μm or less, which is fine as compared with calcium aluminate (average particle diameter of 8 μm to 100 μm), and thus the setting modifier is easily dissolved in water. Therefore, when water is added to the rapid-hardening cement composition according to the aspect of the present invention, the setting modifier is rapidly dissolved in water in a stable manner over a wide temperature range, and a setting modifier action by the setting modifier is exerted at an early stage. Thus, variations in setting initial time due to an environmental temperature become small. In addition, since the setting modifier action by the setting modifier is exerted at an early stage, the setting initial time becomes stable and long, and fluidity after addition of water becomes high. Furthermore, after completion of the setting modifier action by the setting modifier, hardening acceleration action of cement is exerted by the calcium aluminate and the inorganic sulfate; and thereby, it is possible to improve properties of early age strength of the rapid-hardening cement composition. Furthermore, the setting modifier is dispersed as fine particles in the rapid-hardening cement composition. Thus, even in the case where the rapid-hardening cement composition according to the aspect of the present invention is stored for a long period of time, it is unlikely that the setting modifier is segregated and an amount of the setting modifier becomes non-uniform. Therefore, even in the case of being stored for a long period of time, variations in setting initial time are small and properties of early age strength are excellent.

Herein, the rapid-hardening cement composition according to the aspect of the present invention is preferably an injection grout for pavement.

As described above, in the rapid-hardening cement composition according to the aspect of the present invention, the setting initial time is stable and long, and fluidity is high from addition of water to the setting initial time. Thus, excellent working properties are exhibited. Also, due to high properties of early age strength, it is possible to shorten the time from the start to the end in construction. Therefore, the rapid-hardening cement composition according to the aspect of the present invention can be suitably used as an injection grout for pavement for roads and like where early opening for traffic is desired.

Further, in the rapid-hardening cement composition according to the aspect of the present invention, it is preferable that the setting modifier contains one or more of inorganic carbonates, oxycarboxylic acids, sodium aluminate, and sodium sulfate.

In this case, the above-mentioned substance is easily dissolved in water. Thus, in the case where the setting modifier contains one or more of the above-mentioned substances, it is possible to reliably reduce variations in the setting initial time of the rapid-hardening cement composition due to an environmental temperature. In addition, since a setting modifier action by the setting modifier is exerted at an early stage, the setting initial time becomes more stable and longer, and fluidity after the addition of water increases.

Furthermore, in the rapid-hardening cement composition according to the aspect of the present invention, the setting modifier may be further added so that the amount of the setting modifier with respect to the entire amount of the rapid-hardening cement composition is in a range of 0.01% by mass to 5% by mass.

In this case, since the amount of the setting modifier with respect to the entire amount of the rapid-hardening cement composition is in a range of 0.01% by mass to 5% by mass, variations in setting initial time of the rapid-hardening cement composition due to an environmental temperature and a long-term storage can be reliably reduced, and properties of early age strength are increased.

With regard to the setting modifier added to the rapid-hardening cement composition, it is preferable that the setting modifier is added as a highly concentrated-setting modifier-containing mixture, and the highly concentrated-setting modifier-containing mixture contains an inorganic powder and the setting modifier in an amount of 50 parts by mass to 300 parts by mass with respect to 100 parts by mass of the inorganic powder.

In this case, by adding the setting modifier as the highly concentrated-setting modifier-containing mixture, it is possible to uniformly disperse the setting modifier in the rapid-hardening cement composition, and to more reliably reduce variations in setting initial time of the rapid-hardening cement composition due to an environmental temperature and a long-term storage.

Further, the rapid-hardening cement composition according to the aspect of the present invention may further contain short fibers that consist of one or more of organic short fibers and carbon short fibers, in an amount of 0.1% by mass to 0.3% by mass with respect to the entire amount of the rapid-hardening cement composition.

In this case, since the short fibers act as a reinforcing material, a hardened body obtained by hardening the rapid-hardening cement composition has improved cracking resistance and excellent durability against fatigue.

Further, the rapid-hardening cement composition according to one aspect of the present invention may further contain a viscosity agent in an amount of 0.1% by mass to 1% by mass with respect to the entire amount of the rapid-hardening cement composition. In this case, the constituent materials of the rapid-hardening cement composition containing the viscosity agent are hardly dispersed in water and the composition becomes stable. Thus, the bleeding rate is reduced and a hardened body having high strength can be formed even in water.

Further, the rapid-hardening cement composition according to the aspect of the present invention may further contain a powdered emulsion in an amount of 0.5% by mass to 30% by mass with respect to the entire amount of the rapid-hardening cement composition.

In this case, the powdered emulsion has low water absorbability and low water permeability. Thus, water hardly penetrates into a hardened body obtained by hardening the rapid-hardening cement composition, and excellent repeated freeze-thaw resistance (freezing and thawing resistance) is obtained.

In addition, the rapid-hardening cement composition according to the aspect of the present invention may further contain an inorganic filler (inorganic fine powder) that consists of one or more of silica stone fine powder, limestone fine powder, coal ash fine powder, fly ash, montmorillonite fine powder, feldspar fine powder, and blast furnace slag fine powder, in an amount of 4% by mass to 50% by mass with respect to the entire amount of the rapid-hardening cement composition.

In this case, by adjusting a blending amount of the inorganic filler, it is possible to easily adjust properties, such as compression strength, Young's modulus, and the like, of a hardened body obtained by hardening the rapid-hardening cement composition.

Further, the rapid-hardening cement composition according to the aspect of the present invention may further contain an anti-freezing agent that consists of one or more of sodium acetate, calcium acetate, and calcium nitrite, in an amount of 1% by mass to 10% by mass with respect to the entire amount of the rapid-hardening cement composition.

In this case, due to the fact that sodium acetate, calcium acetate, or calcium nitrite is contained as an anti-freezing agent, even under a cryogenic temperature environment where water is frozen, freezing of the rapid-hardening cement composition which is kneaded with water can be suppressed, and properties of early age strength are increased.

Effects of the Invention

According to the aspect of the present invention, it is possible to provide a rapid-hardening cement composition in which variations in setting initial time due to an environmental temperature are small, variations in setting initial time are small even in the case of being stored for a long period of time, fluidity is high during a period from addition of water until hardening reaction proceeds, and properties of early age strength are excellent.

BRIEF DESCRIPTION OF THE DRAWINGS

FIG. 1(A) is an image with a magnification of 1,000 times, and FIG. 1(B) is an image with a magnification of 3,000 times.

EMBODIMENTS FOR CARRYING OUT THE INVENTION

Figure 1:
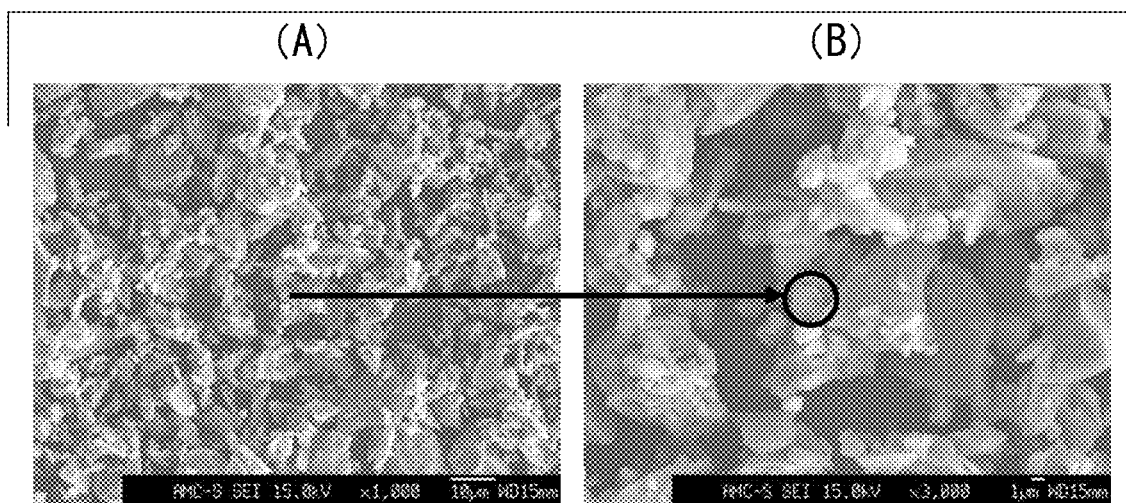
FIG. 1 shows scanning electron microscopic images of a mixed and ground product of a calcium aluminate clinker and a setting modifier which is produced in Example 1.

Embodiments of the present invention will be described below.

A rapid-hardening cement composition of the present embodiment contains a rapid-hardening admixture, and cement in an amount of 100 parts by mass to 2,000 parts by mass with respect to 100 parts by mass of the rapid-hardening admixture. The rapid-hardening admixture is a composition that contains calcium aluminate, inorganic sulfate in an amount of 50 parts by mass to 200 parts by mass with respect to 100 parts by mass of the calcium aluminate, and a setting modifier in an amount of 0.1 parts by mass to 10 parts by mass with respect to 100 parts by mass of the calcium aluminate. The average particle diameter of the calcium aluminate in the rapid-hardening admixture is in a range of 8 μm to 100 μm, and the average particle diameter of the setting modifier is 5 μm or less. The rapid-hardening cement composition of the present embodiment may further contain an admixture such as a fine aggregate, a setting modifier, short fibers, a viscosity agent, a powdered emulsion, an inorganic filler, an anti-freezing agent, and the like. The respective components of the rapid-hardening cement composition of the present embodiment will be described below.

(Rapid-Hardening Admixture)

The rapid-hardening admixture is a composition that contains calcium aluminate, inorganic sulfate, and a setting modifier.

The calcium aluminate elutes calcium ions and aluminum ions when being brought into contact with water at the time of using the rapid-hardening cement composition and these ions are reacted with sulfate ions eluted from the inorganic sulfate to produce a hydrate such as ettringite ($3CaO.Al_2O_3.CaSO_4.32H_2O$) of needle-like crystal, monosulfate ($3CaO.Al_2O_3.CaSO_4.12H_2O$), or the like. Thereby, the calcium aluminate has an action of improving properties of early age strength of the rapid-hardening cement composition. In the case where an elution rate of calcium ions and aluminum ions from the calcium aluminate becomes too low, reactivity with sulfate ions may be deteriorated, and properties of early age strength of the rapid-hardening cement composition may be decreased. On the other hand, in the case where an elution rate of calcium ions and aluminum ions from the calcium aluminate becomes too high, reactivity with sulfate ions is increased and a setting initial time of the rapid-hardening cement composition becomes too fast. Thus, it may be difficult to regulate the setting initial time even in the case of using a setting modifier, and it may be difficult to secure a sufficient pot life.

Therefore, in the present embodiment, the average particle diameter (average primary particle diameter) of the calcium aluminate is set to be in a range of 8 μm to 100 μm. In the case where the average particle diameter of the calcium aluminate is less than 8 μm, the elution rate of calcium ions and aluminum ions becomes too high, which may make it difficult to regulate the setting initial time of the rapid-hardening cement composition. On the other hand, in the case where the average particle diameter of the calcium aluminate exceeds 100 μm, the elution rate of calcium ions and aluminum ions becomes too low, which may decrease properties of early age strength of the rapid-hardening cement composition.

The average particle diameter of the calcium aluminate contained in the rapid-hardening admixture can be measured using, for example, a scanning electron microscope (SEM) and an electron probe microanalyzer (EPMA). That is, it is possible to perform measurements as follows: particles of the calcium aluminate contained in the rapid-hardening admixture are identified from an SEM image and results of elements detected by an elemental analysis with the EPMA of the rapid-hardening admixture; particle diameters are measured from the SEM image with respect to the particles identified as the calcium aluminate; and the average value thereof is obtained. Particles in which only calcium and aluminum are detected by the elemental analysis with the EPMA can be identified as the particles of the calcium aluminate.

As the calcium aluminate, it is preferable to use one having one or more compositions selected from the group consisting of $12CaO.7Al_2O_3$, $11CaO.7Al_2O_3.CaF_2$, and $CaO.Al_2O_3$, and having a vitrification rate (percentage of glass content) of 80% or more. The vitrification rate is more preferably 80% to 98%, and particularly preferably 90% to 98%. The calcium aluminate having the above-mentioned composition and vitrification rate has a high elution rate of calcium ions and aluminum ions and a high reactivity when being brought into contact with water. Thus, it is possible to reliably improve properties of early age strength of the rapid-hardening cement composition.

It is preferable that the calcium aluminate has a Blaine specific surface area of 3,000 $cm^2/g$ to 5,500 $cm^2/g$. Due to the Blaine specific surface area of 3,000 $cm^2/g$ or more, when the calcium aluminate is brought into contact with water, the elution rate of calcium ions and aluminum ions becomes high and the reactivity with sulfate ions eluted from the inorganic sulfate becomes high. Thus, it is possible to more reliably improve the properties of early age strength of the rapid-hardening cement composition. On the other hand, due to the Blaine specific surface area of 5,500 $cm^2/g$ or less, when the calcium aluminate is brought into contact with water, the case where the elution rate of calcium ion and aluminum ion becomes excessively high is prevented, and the reactivity with sulfate ions is prevented from becoming too high. The Blaine specific surface area is measured by a specific surface area test using a Blaine air permeability apparatus described in JIS R 5201 "Physical Test Method for Cement".

The inorganic sulfate contained in the rapid-hardening admixture elutes sulfate ions when being brought into contact with water at the time of using the rapid-hardening cement composition and these ions are reacted with calcium ions and aluminum ions eluted from the calcium aluminate to produce a hydrate such as ettringite of needle-like crystal, monosulfate, or the like. Thus, the inorganic sulfate has an action of improving properties of early age strength of the rapid-hardening cement composition.

In the case where an elution rate of sulfate ions from the inorganic sulfate becomes slow, reactivity with calcium ions and aluminum ions eluted from the calcium aluminate may be deteriorated, the time from start of setting to hardening may become longer, and properties of early age strength of the rapid-hardening cement composition may be deteriorated. Therefore, it is preferable that the inorganic sulfate has a Blaine specific surface area of 8,000 $cm^2/g$ or more. Since the inorganic sulfate having the above-mentioned Blaine specific surface area has a high elution rate of sulfate ions and a high reactivity with calcium ions and aluminum ions eluted from the calcium aluminate, it is possible to reliably improve properties of early age strength of the rapid-hardening cement composition. In addition, it is preferable that the Blaine specific surface area of the inorganic sulfate is 12,000 $cm^2/g$ or less. In the case where the Blaine specific surface area becomes too large, the elution rate of sulfate ions becomes too high and the reactivity with calcium ions and aluminum ions becomes excessively high. Thus, the time from start of setting to hardening becomes shorter, which may make it difficult to secure a sufficient pot life even in the case of using a setting modifier.

The inorganic sulfate is preferably anhydrite, particularly preferably anhydrite type II. The anhydrite (in particular, anhydrite type II) has a high reactivity with the calcium aluminate. Thus, it is possible to more reliably improve the properties of early age strength of the rapid-hardening cement composition.

The setting modifier contained in the rapid-hardening admixture has an action of regulating (controlling) the time from addition of water to the rapid-hardening cement composition until setting of the rapid-hardening cement composition starts at the time of using the rapid-hardening cement composition, that is, an action of delaying a hardening time of cement. Due to delayed hardening time of the cement by the setting modifier, fluidity of the rapid-hardening cement composition is improved during a period from addition of water to the rapid-hardening cement composition until hardening reaction of the cement proceeds.

It is considered that the setting modifier is dissolved in water and chelated with calcium ions or aluminum ions eluted from the rapid-hardening admixture (calcium aluminate) to form a film on a surface of the rapid-hardening admixture, so that elution of calcium ions and aluminum ions from the rapid-hardening admixture is temporarily suppressed; and thereby, a delaying action of a hardening time of the cement is developed by the setting modifier. However, since the film formed on the surface of the rapid-hardening admixture is extremely thin, the film is dissolved and disappears in a relatively short time. After disappearance of the film, re-elution of calcium ions and aluminum ions from the rapid-hardening admixture begins and hardening reaction of the cement proceeds.

In the present embodiment, the setting modifier is fine particles having an average particle diameter (average primary particle diameter) of 5 μm or less. Therefore, it is possible to rapidly dissolve the setting modifier in water over a relatively wide temperature range. The average particle diameter of the setting modifier is preferably 1 μm or more. In the case where the average particle diameter is less than 1 μm, aggregated particles may be easily formed.

The setting modifier contains one or more of inorganic carbonates, oxycarboxylic acids, sodium aluminate, and sodium sulfate. Since these agents are easily dissolved in water and one or more of these agents are contained as a setting modifier, it is possible to reliably reduce variations in setting initial time of the rapid-hardening cement composition due to an environmental temperature. In addition, since a setting modifier action by the setting modifier is exerted at an early stage, a setting initial time becomes more stable and longer, and fluidity after addition of water increases. The inorganic carbonate is preferably carbonate or hydrogen carbonate of an alkali metal. Examples of the inorganic carbonate include sodium carbonate, potassium carbonate, sodium hydrogen carbonate, potassium hydrogen carbonate-, lithium carbonate, and ammonium carbonate. One of these inorganic carbonates may be used alone, or two or more thereof may be used in combination. Examples of the oxycarboxylic acid include tartaric acid, citric acid, malic acid, gluconic acid, and maleic acid. One of these oxycarboxylic acids may be used alone, or two or more thereof may be used in combination.

It is preferable that two or more of inorganic carbonates, oxycarboxylic acids, sodium aluminate, and sodium sulfate are used in combination as the setting modifier. As combinations of two or more thereof, a 3-member combination of inorganic carbonates, oxycarhoxylic acids, and sodium aluminate is preferable, and a 4-member combination of inorganic carbonates, oxycarboxylic acids, sodium aluminate, and sodium sulfate is more preferable. In the case where two or more setting modifiers are used in combination, the only required condition is that at least one of the setting modifiers consists of fine particles having an average particle diameter of 5 μm or less.

Among the setting modifiers, sodium sulfate has a particularly high rate of dissolution in water. Therefore, sodium sulfate has a high effect of improving fluidity of the rapid-hardening cement composition after addition of water. In addition, since sodium sulfate is easily dissolved in water over a wide temperature range, it also has an effect of reducing temperature dependency, with respect to a setting initial time, of the rapid-hardening cement composition after addition of water.

It is preferable that the fine particles of the setting modifier are dispersed in the rapid-hardening admixture as primary particles or aggregated particles close thereto. In the case where the setting modifier is dispersed as primary particles or aggregated particles close thereto, a rate of dissolution thereof in water is improved, and a setting modifier action by the setting modifier is exerted at an early stage. Thus, it is possible to reliably reduce variations in setting initial time due to an environmental temperature. In addition, it is preferable that the fine particles of the setting modifier are adhered to a surface of the calcium aluminate. In this case, since the setting modifier comes into contact with water prior to the calcium aluminate, and thus is easily dissolved, so that a setting modifier action by the setting modifier is exerted at an early stage. Thus, it is possible to more reliably reduce variations in setting initial time due to an environmental temperature.

The average particle diameter of the setting modifier contained in the rapid-hardening admixture can be measured using, for example, an SEM and an EPMA. That is, it is possible to perform measurements as follows: particles of the setting modifier contained in the rapid-hardening admixture are identified from an SEM image and results of elements detected by an elemental analysis with an EPMA of the rapid-hardening admixture; particle diameters are measured from the SEM image with respect to the particles identified as the setting modifier; and the average value thereof is obtained. For example, particles in which only sodium is detected by the elemental analysis with the EPMA can be identified as the particles of sodium carbonate (inorganic carbonate).

In the present embodiment, the blending amounts of the calcium aluminate, the inorganic sulfate, and the setting modifier contained in the rapid-hardening admixture are set such that, with respect to 100 parts by mass of the calcium aluminate, the amount of the inorganic sulfate is in a range of 50 parts by mass to 200 parts by mass and the amount of the setting modifier is in a range of 0.1 parts by mass to 10 parts by mass.

In the case where the blending amount of the inorganic sulfate is too small, a production amount of a reaction product (ettringite, monosulfate) of the inorganic sulfate and the calcium aluminate may be decreased, and properties of early age strength of the rapid-hardening cement composition may be decreased. On the other hand, in the case where the blending amount of the inorganic sulfate is too large, a setting initial time of the rapid-hardening cement composition becomes fast, which may make it difficult to secure a sufficient pot life. In addition, amounts of calcium ions and aluminum ions eluted from the calcium aluminate are relatively small with respect to an amount of sulfate ions, so that a production amount of ettringite is reduced. Thus, properties of early age strength of the rapid-hardening cement composition may be decreased. Furthermore, due to influence of the remaining inorganic sulfate, an amount of expansion after hardening becomes excessive, which may cause expansion breakdown.

Further, in the case where the blending amount of the setting modifier is too small, an action of the setting modifier is completed in a short period of time. Thus, a setting initial time of the rapid-hardening cement composition becomes fast, which may make it difficult to secure a sufficient pot life. On the other hand, in the case where the blending amount of the setting modifier is too large, an action of the setting modifier may continue for a predetermined time or more, and properties of early age strength of the rapid-hardening cement composition may be decreased.

The rapid-hardening admixture can be produced, for example, by a method including: a mixing and grinding step of mixing and grinding a clinker containing calcium aluminate and a setting modifier to prepare a mixed and ground product; and a mixing step of mixing the resultant mixed and ground product with inorganic sulfate.

In the above-mentioned method for producing a rapid-hardening admixture, the clinker used as a raw material of the calcium aluminate has a high hardness as compared with the setting modifier. Therefore, by mixing and grinding the clinker of calcium aluminate and the setting modifier, the setting modifier selectively becomes fine particles, and fine particles of the setting modifier are produced. The fine particles of the setting modifier easily adhere to surfaces of relatively coarse calcium aluminate particles. Accordingly, in the mixing and grinding step, it is possible to obtain a mixed and ground product in which the fine particles of the setting modifier are dispersed as primary particles or aggregated particles close thereto in a state of being adhered to a surface of the calcium aluminate. As a mixing and grinding apparatus, a grinding apparatus such as an E type mill, a vertical type mill, a tube mill, and the like can be used, hut not limited thereto. Various grinding apparatuses commonly used as a grinding apparatus for clinker can be used.

The clinker containing calcium aluminate is preferably a clinker mineral.

The average particle diameter of the clinker of calcium aluminate before grinding is preferably 1 mm to 30 mm. In addition, the particle diameter of the setting modifier before grinding is preferably 150 μm to 500 μm.

In the mixing and grinding step, the mixing and grinding is preferably carried out until a Blaine specific surface area of the mixed and ground product becomes in a range of 3,000 cm$^2$/g to 5,500 cm$^2$/g, and is particularly preferably carried out until the Blaine specific surface area becomes in a range of 3,000 cm$^2$/g to 4,500 cm$^2$/g. By carrying out the mixing and grinding until the Blaine specific surface area falls within the above-mentioned range, the clinker containing calcium aluminate and the setting modifier are sufficiently mixed and ground; and thereby, it is possible to reliably obtain a mixed and ground product in which the fine particles of the setting modifier are dispersed as primary particles or aggregated particles close thereto in a state of being adhered to a surface of the calcium aluminate. In addition, the average particle diameter of the calcium aluminate in the mixed and ground product is usually in a range of 8 μm to 100 μm, and the average particle diameter of the setting modifier is usually 5 μm or less.

In the mixing step, the inorganic sulfate to be mixed with the mixed and ground product obtained in the mixing and grinding step is preferably anhydrite having a Blaine specific surface area of 8,000 cm$^2$/g or more.

In the mixing step, the mixed and ground product and the inorganic sulfate are mixed by a dry mixing. As a dry mixing apparatus, a mixer such as a V type mixer, a ribbon mixer, a Proshear mixer, and the like can be used, but not limited thereto. Various mixing apparatuses commonly used as a mixing apparatus for cement materials can be used. A mixing time can be appropriately adjusted depending on a capacity of the mixing apparatus and blending amounts of the respective materials.

(Cement)

As the cement, ordinary Portland cement, high early strength Portland cement, moderate heat Portland cement, low heat Portland cement, Portland blast-furnace cement, Portland pozzolan cement, Portland fly ash cement, silica fume cement, and the like can be used. One of the cements may be used alone, or two or more thereof may be used in combination. The cement is preferably Portland cement, in particular, ordinary Portland cement.

The blending amount of the cement is generally in a range of 100 parts by mass to 2,000 parts by mass with respect to 100 parts by mass of the rapid-hardening admixture. In the case where the blending amount of the cement is within the above-mentioned range, it is possible to obtain a hardened body of a rapid-hardening cement composition which is excellent in properties of early age strength by the rapid-hardening admixture and in properties of long-term strength by the cement.

(Fine Aggregate)

The fine aggregate has an action of suppressing shrinkage (autogenerous shrinkage) of a hardened body due to hardening of the rapid-hardening cement composition and shrinkage (drying shrinkage) due to dissipation of moisture after hardening. The rapid-hardening cement composition containing the fine aggregate can be suitably used for semi-flexible pavements. The fine aggregate is preferably sand, more preferably sand having a particle diameter of 90 to 1,000 μm, and even more preferably sand having a particle diameter of 90 to 200 μm. In the case where the particle diameter of the sand becomes too small, agitation performance of cement milk prepared by mixing the rapid-hardening cement composition with water and wear resistance of the hardened body may be decreased, and skid resistance thereof may be decreased. On the other hand, in the case where the particle diameter of sand becomes too large, sand may easily settle in the cement milk, and injection properties of the cement milk to a pavement body may be decreased.

The blending amount of the fine aggregate is generally in a range of 10% by mass to 67% by mass with respect to the entire amount of the rapid-hardening cement composition. In the case where the blending amount of the fine aggregate is too small, not only an effect of reducing shrinkage of the hardened body may not be sufficiently obtained, but also agitation performance of the cement milk and wear resistance may be decreased and skid resistance may be decreased. On the other hand, in the case where the blending amount of the fine aggregate is too large, properties of early age strength may be decreased, and material separation may occur and bleeding may easily occur.

(Setting Modifier)

In the rapid-hardening cement composition of the present embodiment, as described above, fine particles of the setting modifier having an average particle diameter of 5 μm or less are contained as a constituent of the rapid-hardening admixture. The setting modifier may be further added so that an amount of the setting modifier with respect to the entire amount of the rapid-hardening cement composition is in a range of 0.01% by mass to 5% by mass. Herein, the amount of the setting modifier with respect to the entire amount of the rapid-hardening cement composition is a total amount of the setting modifier (also referred to as a first setting modifier) contained in the rapid-hardening admixture and the setting modifier (also referred to as a second setting modifier) added separately from the rapid-hardening admixture. In this case, since a setting time can be regulated by the setting modifier contained in the rapid-hardening admixture and the setting modifier added separately from the rapid-hardening admixture, it is possible to more reliably reduce variations in setting initial time of the rapid-hardening cement composition due to an environmental temperature and a long-term storage. In addition, by separately adding the setting modifier, it is possible to regulate (control) the setting initial time of the rapid-hardening cement composition to a required time. In addition, in the rapid-hardening cement composition of the present embodiment, the setting modifier contained in the rapid-hardening admixture is fine particles and easily dissolved in water, so that a sufficient pot life can be normally secured. Thus, the amount of the setting modifier to be separately added can be reduced.

In the case where the amount of the setting modifier is less than 0.01% by mass with respect to the entire amount of the rapid-hardening cement composition, an action of regulating a setting time may be insufficient. On the other hand, in the case where the amount of the setting modifier exceeds 5% by mass with respect to the entire amount of the rapid-hardening cement composition, properties of long-term strength by the cement may be decreased.

The setting modifier added separately from the rapid-hardening admixture may be added alone to the rapid-hardening cement composition. However, the setting modifier is preferably added as a premixed mixture of an inorganic powder and the setting modifier. The mixture of the inorganic powder and the setting modifier is preferably a highly concentrated-setting modifier-containing mixture in which the setting modifier is contained in an amount of 50 parts by mass to 300 parts by mass with respect to 100 parts by mass of the inorganic powder. By adding the setting modifier to the rapid-hardening cement composition as the highly concentrated-setting modifier-containing mixture, the setting modifier is easy to be uniformly dispersed in the rapid-hardening cement composition. As the inorganic powder, cement (in particular, Portland cement), limestone powder, silica stone powder, blast furnace slag powder, coal ash, fly ash, clay minerals, calcium aluminate powder, or inorganic sulfates powder can be used. The inorganic powder is preferably a fine powder having a Blaine specific surface area in a range of 2,500 cm$^2$/g to 5,000 cm$^2$/g. Since the inorganic powder having a Blaine specific surface area in the above-mentioned range has a high dispersibility, the highly concentrated-setting modifier-containing mixture in which this inorganic powder is used is easy to be uniformly dispersed in the rapid-hardening cement composition. The particle diameter of the setting modifier contained in the highly concentrated-setting modifier-containing mixture is preferably in a range of 1 μm to 500 μm. Since the setting modifier having a particle diameter in the above-mentioned range has a high dispersibility in the inorganic powder, it is easy to prepare a highly concentrated-setting modifier-containing mixture which has a uniform composition.

(Short Fibers)

The short fibers act as a reinforcing material. Therefore, a hardened body obtained by hardening the rapid-hardening cement composition including the short fibers has improved cracking resistance and excellent durability against fatigue.

As the short fibers, organic short fibers and carbon short fibers can be used. Examples of the organic short fibers include PVA short fibers (polyvinyl alcohol short fibers), polyamide short fibers, aramid short fibers, polypropylene short fibers, rayon short fibers, and the like. One of these short fibers may be used alone, or two or more thereof may be used in combination.

The fiber length of the short fibers is preferably in a range of 1 mm to 10 mm. In the case where the fiber length is shorter than 1 mm, a sufficient fiber reinforcing effect may not be obtained. On the other hand, in the case where the fiber length exceeds 10 mm, fluidity may be impaired by resistance of the fibers, and working properties may be hindered, for example, injection properties to a narrow portion or a semi-flexible pavement may be decreased. The fiber diameter is usually in a range of 5 μm to 100 μm.

The blending amount of the short fibers is generally in a range of 0.1% by mass to 0.3% by mass with respect to the entire amount of the rapid-hardening cement composition. In the case where the blending amount of the short fibers is too small, an action of improving cracking resistance of a hardened body and an action of improving durability against fatigue may be insufficient. On the other hand, in the case where the blending amount of the short fibers is too large, fluidity of a mixture of the rapid-hardening cement composition and water may be decreased.

(Viscosity Agent)

The viscosity agent has an action of increasing a viscosity of the rapid-hardening cement composition, suppressing separation of constituent materials of the rapid-hardening cement composition in water, and stabilizing the composition. Therefore, in the rapid-hardening cement composition containing the viscosity agent, a bleeding rate is decreased, and a hardened body having high strength can be formed even in water.

Examples of the viscosity agent include synthetic polymers, guar gum derivatives, stearyl ethers, cellulose derivatives (methylcellulose, carboxymethylcellulose, hydroxymethylcellulose, hydroxypropylmethylcellulose, hydroxypropylmethylcellulose, hydroxyethylmethylcellulose), and the like. One of these viscosity agents may be used alone, or two or more thereof may be used in combination.

The blending amount of the viscosity agent is generally in a range of 0.1% by mass to 1% by mass with respect to the entire amount of the rapid-hardening cement composition. In the case where the blending amount of the viscosity agent is too small, anti-washout under water of the rapid-hardening cement composition may be insufficient. On the other hand, in the case where the blending amount of the viscosity agent is too large, fluidity of a mixture of the rapid-hardening cement composition and water may be decreased.

(Powdered Emulsion)

The powdered emulsion is a resin having low water absorbability and low water permeability, and has an action of making water hardly penetrate into a hardened body obtained by hardening the rapid-hardening cement composition. Therefore, the rapid-hardening cement composition containing the powdered emulsion is excellent in freeze-thaw resistance after being immersed in water.

Examples of the powdered emulsion include vinyl acetate/Veova/acrylic acid ester copolymer resin, vinyl acetate copolymer resin, vinyl acetate/ethylene copolymer resin, vinyl acetate/acryl copolymer resin, acrylic resin, and the like. One of these powdered emulsions may be used alone, or two or more thereof may be used in combination.

The blending amount of the powdered emulsion is generally in a range of 0.5% by mass to 30% by mass with respect to the entire amount of the rapid-hardening cement composition. In the case where the blending amount of the powdered emulsion is too small, an action of improving freeze-thaw resistance of a hardened body of the rapid-hardening cement composition may be insufficient. On the other hand, in the case where the blending amount of the powdered emulsion is too large, fluidity of a mixture of the rapid-hardening cement composition and water may be decreased.

(Inorganic Filler)

The inorganic filler acts as a modifier of properties such as compression strength, Young's modulus, and the like of a hardened body obtained by hardening the rapid-hardening cement composition.

Examples of the inorganic filler include silica stone fine powder, limestone fine powder, coal ash fine powder, fly ash, montmorillonite fine powder, feldspar fine powder, blast furnace slag fine powder, and the like. One of these inorganic fillers may be used alone, or two or more thereof may be used in combination. The inorganic filler preferably has a Blaine specific surface area in a range of 2,500 cm$^2$/g to 5,000 cm$^2$/g. Since the fine powder having a Blaine specific surface area in the above-mentioned range has a high dispersibility in cement, it is possible to form a mixture having a uniform composition by mixing it with cement.

The blending amount of the inorganic filler is generally in a range of 4% by mass to 50% by mass with respect to the entire amount of the rapid-hardening cement composition. In the case where the blending amount of the inorganic filler is too small, an effect of regulating (controlling) compression strength and Young's modulus of a hardened body of the rapid-hardening cement composition may be insufficient. On the other hand, in the case where the blending amount of the inorganic filler is too large, a proportion of the rapid-hardening admixture and the cement may be relatively decreased, and properties of early age strength and properties of long-term strength may be decreased.

(Anti-Freezing Agent)

Sodium acetate, calcium acetate, or calcium nitrite reacts with water to generate heat, and acts as an anti-freezing agent to prevent freezing of a mixture of the rapid-hardening cement composition and water under a cryogenic temperature environment where water is frozen. Therefore, the rapid-hardening cement composition containing the anti-freezing agent makes it possible to obtain a hardened body having high properties of early age strength even under a cryogenic temperature environment.

One of the anti-freezing agents may be used alone, or two or more thereof may be used in combination.

The blending amount of the anti-freezing agent is generally in a range of 1% by mass to 10% by mass with respect to the entire amount of the rapid-hardening cement composition. In the case where the blending amount of the anti-freezing agent is too small, an action as the anti-freezing agent may become insufficient so that the rapid-hardening cement composition freezes, and no strength may be produced at all. On the other hand, in the case where the blending amount of the anti-freezing agent is too large, a salting-out action may occur in a mixture of the rapid-hardening cement composition and water, and fluidity may be decreased.

The rapid-hardening admixture used in the rapid-hardening cement composition of the present embodiment having a constitution as described above is easily dissolved in water, because the average particle diameter of the calcium aluminate is 8 µm to 100 µm, and the average particle diameter of the setting modifier is 5 µm or less, so that the setting modifier is fine as compared with the calcium aluminate. Therefore, when water is added to the rapid-hardening cement composition of the present embodiment, the setting modifier is rapidly dissolved in water in a stable manner over a wide temperature range, and a setting modifier action by the setting modifier is exerted at an early stage. Thus, variations in setting initial time due to an environmental temperature become small. In addition, since the setting modifier action by the setting modifier is exerted at an early stage, the setting initial time becomes stable and long, and fluidity after addition of water becomes high. Furthermore, after completion of the setting modifier action by the setting modifier, hardening acceleration action of cement is exerted by the calcium aluminate and the inorganic sulfate; and therefore, it is possible to improve properties of early age strength of the rapid-hardening cement composition. Furthermore, the setting modifier is dispersed as fine particles in the rapid-hardening cement composition. Thus, even in the case where the rapid-hardening cement composition of the present embodiment is stored for a long period of time, it is unlikely that the setting modifier is segregated and an amount of the setting modifier becomes non-uniform. Therefore, even in the case of being stored for a long period of time, variations in setting initial time are small and properties of early age strength are excellent.

As described above, in the rapid-hardening cement composition of the present embodiment, variations in setting initial time due to an environmental temperature are small. Thus, the rapid-hardening cement composition can be suitably used as a raw material (injection grout for pavement) for a back-filling grout material used for PC pavement and RC pavement, cement milk used for semi-flexible pavement, and the like which are mainly used outdoor. In addition, since the rapid-hardening cement composition of the present embodiment has a high early age strength, it is, for example, possible to form a pavement having practical strength that allows a road to be opened to traffic in 2 hours.

Further, in the rapid-hardening cement composition of the present embodiment, the setting modifier contains one or more of inorganic carbonates, oxycarhoxylic acids, sodium aluminate, and sodium sulfate. Thus, it is possible to reliably reduce variations in setting initial time of the rapid-hardening cement composition due to an environmental temperature. In addition, since a setting modifier action by the setting modifier is exerted at an early stage, a setting initial time becomes more stable and longer, and fluidity after addition of water increases. Since sodium sulfate has a particularly high rate of dissolution in water, sodium sulfate has a high effect of improving fluidity of the rapid-hardening cement composition after addition of water.

In addition, in the case of the rapid-hardening cement composition containing the fine aggregate, shrinkage of a hardened body is suppressed. Therefore, the rapid-hardening cement composition containing the fine aggregate can be suitably used as a raw material for cement milk used in semi-flexible pavements or the like.

Further, in the rapid-hardening cement composition containing the setting modifier, variations in setting initial time due to an environmental temperature become reliably small. Thus, the rapid-hardening cement composition can be suitably used at sites with various environmental temperatures. By adding the setting modifier to the cement as a highly concentrated-setting modifier-containing mixture in which the setting modifier is mixed with the inorganic powder, it is possible to uniformly disperse the setting modifier in the cement. Thus, it is possible to more reliably reduce variations in setting initial time due to an environmental temperature.

In addition, with regard to the rapid-hardening cement composition containing the short fibers, a hardened body has improved cracking resistance and excellent durability against fatigue. Therefore, the rapid-hardening cement composition containing such short fibers can be suitably used as a material of a hack-filling grout material used for PC pavement and RC pavement of airport runways where a heavy load is applied.

In addition, a rapid-hardening cement composition containing the viscosity agent has a low bleeding rate and can form a hardened body with high strength even in water. Therefore, the rapid-hardening cement composition containing the viscosity agent can be suitably used as a material of a hack-filling grout material to be injected into a place having stagnant water in a gap between a PC pavement hoard or a RC pavement board and a roadbed.

Further, the rapid-hardening cement composition containing the powdered emulsion has excellent freeze resistance after being immersed in water. Therefore, the rapid-hardening cement composition containing the powdered emulsion can be suitably used as an injection grout for pavement in cold districts.

Further, the rapid-hardening cement composition containing the inorganic filler can regulate (control) compression strength and Young's modulus in a predetermined manner. Therefore, the rapid-hardening cement composition containing the inorganic filler can be suitably used as an injection grout for pavement in various applications.

Further, the rapid-hardening cement composition containing the anti-freezing agent makes it possible to obtain a hardened body having high properties of early age strength even under a cryogenic temperature environment. Therefore, the rapid-hardening cement composition containing the anti-freezing agent can be suitably used as an injection grout for pavement in cold districts.

Although the rapid-hardening cement composition which is an embodiment of the present invention has been described above, the present invention is not limited thereto and can be appropriately changed within a scope that does not depart from the technical features of the invention.

For example, the rapid-hardening cement composition may contain a water-reducing agent, an air entraining and water-reducing agent, a high range water-reducing agent, a high range air entraining and water-reducing agent, a super-plasticizing agent, a waterproofing agent, a foaming agent, a blowing agent, a defoaming agent, an anti-rust agent for reinforced concrete, an admixing agent which is non-separable in water, a water-retention agent, a drying shrinkage reducing agent, an anti-washout admixture for underwater (viscosity agent), an anti-freezing agent, and the like.

EXAMPLES

Next, examples of the present invention will be described in detail together with comparative examples.

[Materials Used]

Types, compositions, and abbreviations of the materials used in these examples and comparative examples are shown in Table 1.

of the sodium carbonate was 3.0 μm. The average particle diameter of the sodium carbonate was measured by the following method.

(Method for Measuring Average Particle Diameter of Sodium Carbonate)

First, a particle shape of the resulting mixed and ground product was observed using a scanning electron microscope (SEM). FIG. 1 shows SEM images of the mixed and ground product. FIG. 1(A) shows an SEM image with a magnification of 1,000 times, and FIG. 1(B) shows an SEM image with a magnification of 3,000 times.

Figure 2:
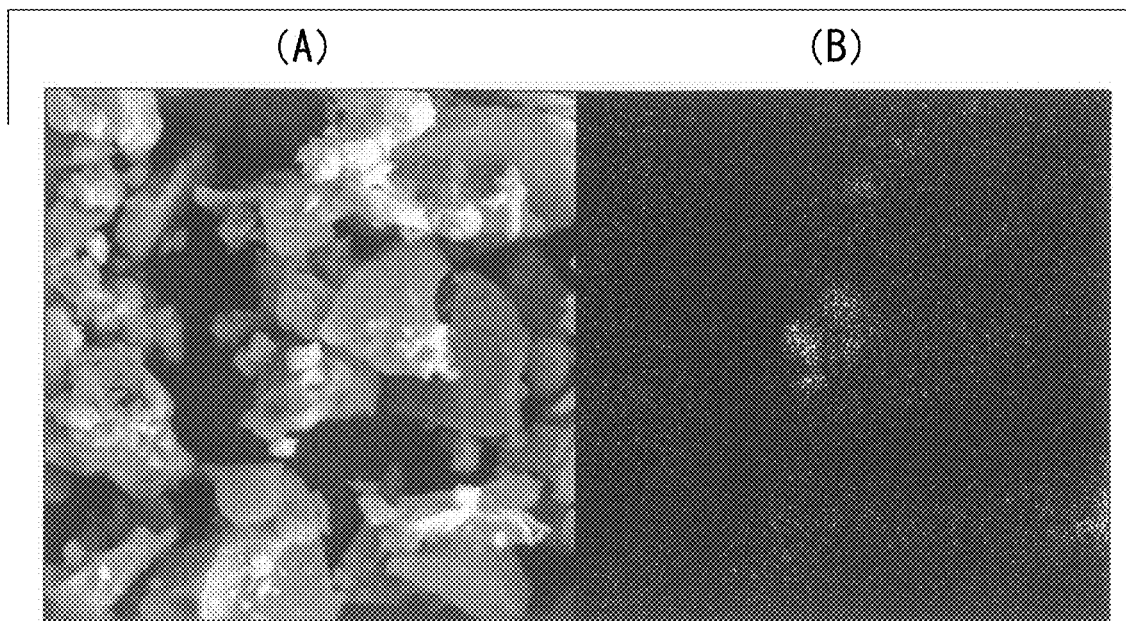
FIG. 2(A) is a scanning electron microscopic image obtained by enlarging a circled area in FIG. 1(B)
FIG. 2(B) is an EPMA mapping image of sodium obtained by performing elemental analysis of particles captured in the image.

Next, element analysis of the particles captured in the SEM images was carried out using an electron probe microanalyzer (EPMA). HG 2 shows the results. FIG. 2(A) is an SEM image obtained by enlarging a circled area in FIG. 1(B), and FIG. 2(B) is a mapping image of an element obtained by performing elemental analysis of particles captured in the SEM image using the EPMA. In FIG. 2(B), a white part represents sodium. From the SEM image of FIG.

TABLE 1

| Material | Composition and the like | Abbreviation |
| --- | --- | --- |
| Calcium aluminate clinker | 12CaO•7Al$_2$O$_3$, vitrification rate: 92%, chemical composition Al$_2$O$_3$: 45.1%, CaO: 47.3%, SiO$_2$: 3.9% | CA-CL |
| Inorganic sulfate | CaSO$_4$, hydrofluoric acid anhydrite type II, Blaine specific surface area of 9,850 cm$^2$/g | CS |
| Ordinary Portland cement | Manufactured by Mitsubishi Materials Corporation, Blaine specific surface area of 3,340 cm$^2$/g | N |
| Inorganic carbonate | Na$_2$CO$_3$, sodium carbonate, particle size of 45 to 90 μm | Na-1 |
| | Na$_2$CO$_3$, sodium carbonate, particle size of 90 to 150 μm | Na-2 |
| | Na$_2$CO$_3$, sodium carbonate, particle size of 150 to 500 μm | Na-3 |
| Sodium aluminate | Na$_2$AlO$_2$, sodium aluminate, particle size of 45 to 90 μm | Al-1 |
| | Na$_2$AlO$_2$, sodium aluminate, particle size of 90 to 150 μm | Al-2 |
| | Na$_2$AlO$_2$, sodium aluminate, particle size of 150 to 500 μm | Al-3 |
| Oxycarboxylic acid | Tartaric acid, particle size of 45 to 90 μm | Ta-1 |
| | Tartaric acid, particle size of 90 to 150 μm | Ta-2 |
| | Tartaric acid, particle size of 150 to 500 μm | Ta-3 |
| Sodium sulfate | Na$_2$SO$_4$, sodium sulfate, particle size of 150 to 500 μm | NS-3 |
| Fine aggregate | Dry silica sand (particle diameter of 90 μm to 200 μm) | S |
| Viscosity agent | Manufactured by BASF, STARVIS WR4600F | WR |
| Defoaming agent | San Nopco Limited, SN DEFOAMER 14HP | 14HP |
| Powdered emulsion | Manufactured by Nichigo-Movinyl Co., Ltd., LDM2071P, vinyl acetate/Veova/acrylic acid ester copolymer resin | P |
| Silica stone fine powder | Manufactured by FUJISAKA, Blaine specific surface area of 4,850 cm$^2$/g | SP |
| Limestone fine powder | Manufactured by Mitsubishi Materials Corporation, Blaine specific surface area of 4,460 cm$^2$/g | LP |
| Anti-freezing agent | Calcium nitrite, Manol Corporation, MANOL anti-freezing agent NAC | CN |

[Preparation of Rapid-Hardening Admixture (SA-1)]

100 parts by mass of calcium aluminate clinker (CA-CL), and, as setting modifiers, 1.0 parts by mass of sodium carbonate (Na-3), 0.5 parts by mass of sodium aluminate (Al-3), and 0.5 parts by mass of tartaric acid (Ta-3) were charged into a mixing and grinding machine, and were mixed and ground until a Blaine specific surface area thereof reached 4,500 cm$^2$/g. The average particle diameter of the calcium aluminate contained in the resulting mixed and ground product was 15 μm and the average particle diameter 2(A) and the mapping image of FIG. 2(B), particles of sodium carbonate were identified, and the longest diameter of the particle identified as the sodium carbonate was measured using the SEM image of FIG. 1(B). By repeating this operation, particle diameters of 100 sodium carbonate particles were measured, and the average value thereof was calculated.

Anhydrite (CS) as the inorganic sulfate was added to a mixer in an amount of 120 parts by mass with respect to 100 parts by mass of the mixed and ground product obtained as described above, and mixed. The obtained mixture was designated as a rapid-hardening admixture (SA-1).

[Preparation of Rapid-Hardening Admixture (SA-2)]

Calcium aluminate clinker (CA-CL) was charged into a mixing and grinding machine, and ground until a Blaine specific surface area thereof reached 4,500 cm²/g, to obtain a calcium aluminate powder.

Anhydrite (CS) was charged into a mixer in an amount of 120 parts by mass with respect to 100 parts by mass of the obtained calcium aluminate powder, and mixed. The obtained mixture was designated as a rapid-hardening admixture (SA-2).

[Preparation of Rapid-Hardening Admixture (SA-3)]

100 parts by mass of calcium aluminate clinker (CA-CL), and, as setting modifiers, 1.0 parts by mass of sodium carbonate (Na-3), 0.5 parts by mass of sodium aluminate (Al-3), 0.5 parts by mass of tartaric acid (Ta-3), and 1.0 parts by mass of sodium sulfate (NS-3) were charged into a mixing and grinding machine, and were mixed and ground until a Blaine specific surface area thereof reached 4,560 cm²/g. The average particle diameter of the calcium aluminate contained in the resulting mixed and ground product was 14.2 μm and the average particle diameter of the sodium carbonate was 2.8 μm.

Anhydrite (CS) was charged into a mixer in an amount of 120 parts by mass with respect to 100 parts by mass of the mixed and ground product obtained as described above, and mixed. The obtained mixture was designated as a rapid-hardening admixture (SA-3).

[Preparation of Highly Concentrated-Setting Modifier-Containing Mixture (Set-1)]

Sodium carbonate (Na-1), sodium carbonate (Na-2), sodium carbonate (Na-3), sodium aluminate (Al-1), sodium aluminate (Al-2), sodium aluminate (Al-3), tartaric acid (Ta-1), tartaric acid (Ta-2), tartaric acid (Ta-3), and ordinary Portland cement (N) as the inorganic powder were charged into a mixer at a ratio of 3:6:3:1:2:1:1:2:1:20 (=Na-1:Na-2:Na-3:Al-1:Al-2:Al-3:Ta-1:Ta-2:Ta-3:N) in terms of a mass ratio, and were dry-mixed. The obtained mixture was designated as a highly concentrated-setting modifier-containing mixture (Set-1).

[Preparation of Setting Modifier Mixture (Set-2)]

Sodium carbonate (Na-1), sodium carbonate (Na-2), sodium carbonate (Na-3), sodium aluminate (Al-1), sodium aluminate (Al-2), sodium aluminate (Al-3), tartaric acid (Ta-1), tartaric acid (Ta-2), and tartaric acid (Ta-3) were charged into a mixer at a ratio of 3:6:3:1:2:1:1:2:1 (=Na-1:Na-2:Na-3:Al-1:Al-2:Al-3:Ta-1:Ta-2:Ta-3) in terms of a mass ratio, and were dry-mixed. The obtained mixture was designated as a setting modifier mixture (Set-2).

[Preparation of Highly Concentrated-Setting Modifier-Containing Mixture (Set-3)]

Sodium carbonate (Na-1), sodium carbonate (Na-2), sodium carbonate (Na-3), sodium aluminate (Al-1), sodium aluminate (Al-2), sodium aluminate (Al-3), tartaric acid (Ta-1), tartaric acid (Ta-2), tartaric acid (Ta-3), sodium sulfate (NS-3), and ordinary Portland cement (N) as the inorganic powder were charged into a mixer at a ratio of 3:6:3:1:2:1:1:2:1:12:32 (=Na-1:Na-2:Na-3:Al-1:Al-2:Al-3:Ta-1:Ta-2:Ta-3:NS-3:N) in terms of a mass ratio, and were dry-mixed. The obtained mixture was designated as a highly concentrated-setting modifier-containing mixture (Set-3).

Examples 1 and 2, and Comparative Example 1

The rapid-hardening admixture (SA-1, SA-2, SA-3), ordinary Portland cement (N), the highly concentrated-setting modifier-containing mixture (Set-1, Set-3), the setting modifier mixture (Set-2), and the defoaming agent (14HP) were charged into a mixer at proportions (parts by mass) shown in Table 2, and were dry-mixed to produce a rapid-hardening cement composition.

TABLE 2

| | Rapid-hardening admixture | | | | | | | |
|---|---|---|---|---|---|---|---|---|
| | SA-1 | SA-2 | SA-3 | N | Set-1 | Set-2 | Set-3 | 14HP |
| Example 1 | 100 | — | — | 400 | 8 | — | — | 1.2 |
| Comparative Example 1 | — | 100 | — | 400 | — | 4 | — | 1.2 |
| Example 2 | — | — | 100 | 400 | — | — | 4 | 1.2 |

Unit: Parts by mass 50 parts by mass of water was added to 100 parts by mass of each of the obtained rapid-hardening cement compositions, and the mixture was kneaded for 2 minutes with a hand mixer to prepare grout. Using the prepared grouts, the respective physical properties of JA funnel flow time, setting time, and compression strength were measured.

The JA funnel flow time was measured in accordance with the standard of Japan Society of Civil Engineers, JSCE-F 531 "Fluidity Test Method of PC Grout".

The setting time was measured in accordance with JIS R 5201 "Physical Test Method for Cement".

The compression strength was measured in accordance with the standard of Japan Society of Civil Engineers, JSCE-G 505 "Compression Strength Test Method for Mortar or Cement Paste Using Cylindrical Specimen".

In order to check temperature characteristics of the rapid-hardening cement composition, the respective physical properties of the JA funnel flow time, the setting time, and the compression strength were measured at environmental temperatures of 5° C., 20° C., and 35° C. The results are shown in Table 3.

Further, in order to check storage characteristics of the rapid-hardening cement composition, the rapid-hardening cement composition was packed in plastic bags (capacity: 12 and pinholes (pore diameter: 0.5 mm) were opened at four corners of the plastic hag. The plastic bags were stored in a room at a temperature of 30° C. and a humidity of 80% RH, and one of the plastic bags was stored for 3 months and the other was stored for 6 months. With respect to the rapid-hardening cement compositions after storage, grouts were prepared, and the respective physical properties of the JA funnel flow time, the setting time, and the compression strength were measured. The respective physical properties at this time were measured at an environmental temperature of 20° C. The results are shown in Table 4.

TABLE 3

|  | Environmental temperature (° C.) | JA funnel flow time (sec) | Setting time (min) | | Compression strength (N/mm²) | | |
|---|---|---|---|---|---|---|---|
|  |  |  | Initial | Finish | Age of 2 hours | Age of 3 hours | Age of 7 days |
| Example 1 | 5 | 20.5 | 45 | 52 | 10.3 | 13.3 | 45.1 |
|  | 20 | 19.8 | 43 | 50 | 11.8 | 14.8 | 48.2 |
|  | 35 | 19.6 | 42 | 46 | 12.4 | 15.1 | 49.0 |
| Comparative Example 1 | 5 | 24.3 | 58 | 72 | 7.5 | 9.0 | 38.9 |
|  | 20 | 19.6 | 45 | 60 | 8.2 | 9.9 | 39.6 |
|  | 35 | 16.5 | 36 | 54 | 10.4 | 12.2 | 41.5 |
| Example 2 | 5 | 17.6 | 46 | 50 | 11.0 | 13.9 | 45.3 |
|  | 20 | 16.8 | 43 | 49 | 12.1 | 15.6 | 48.3 |
|  | 35 | 16.5 | 43 | 43 | 12.5 | 15.3 | 49.6 |

TABLE 4

|  | Storage period (month) | JA funnel flow time (sec) | Setting time (min) | | Compression strength (N/mm²) | | |
|---|---|---|---|---|---|---|---|
|  |  |  | Initial | Finish | 2 hours | 3 hours | 7 days |
| Example 1 | Immediately after production | 19.8 | 43 | 50 | 11.8 | 14.8 | 48.2 |
|  | 3 | 19.6 | 43 | 51 | 12.0 | 14.9 | 48.5 |
|  | 6 | 19.5 | 44 | 51 | 12.2 | 14.6 | 48.3 |
| Comparative Example 1 | Immediately after production | 19.6 | 45 | 60 | 8.2 | 9.9 | 39.6 |
|  | 3 | 22.6 | 73 | 95 | 0.6 | 1.5 | 33.9 |
|  | 6 | 24.8 | 120 or more | 180 or more | Not available | Not available | 32.0 |
| Example 2 | Immediately after production | 16.8 | 43 | 49 | 12.1 | 15.6 | 48.3 |
|  | 3 | 16.7 | 44 | 49 | 12.2 | 15.1 | 48.7 |
|  | 6 | 16.5 | 42 | 48 | 12.4 | 16.1 | 48.6 |

From the results shown in Table 3, it was confirmed that the rapid-hardening cement compositions of Examples 1 and 2 had small variations in the JA funnel flow time, the setting time, and the compression strength due to an environmental temperature as compared with the rapid-hardening cement composition of Comparative Example 1, and thus were excellent in temperature stability. In particular, it was confirmed that the rapid-hardening cement composition of Example 2 containing sodium sulfate had a short JA funnel flow time and excellent fluidity.

Further, from the results shown in Table 4, it was confirmed that the rapid-hardening cement compositions of Examples 1 and 2 had small variations in the JA funnel flow time, the setting time, and the compression strength due to storage as compared with the rapid-hardening cement composition of Comparative Example 1, and thus were excellent in storage stability.

Examples 3 and 4, and Comparative Example 2

The rapid-hardening admixture (SA-1, SA-2, SA-3), ordinary Portland cement (N), the highly concentrated-setting modifier-containing mixture (Set-1, Set-3), the setting modifier mixture (Set-2), the fine aggregate (S), the powdered emulsion (P), and the defoaming agent (14HP) were charged into a mixer at proportions (parts by mass) shown in Table 5, and were dry-mixed to produce a rapid-hardening cement composition.

TABLE 5

|  | Rapid-hardening admixture | | | | | | | | | |
|---|---|---|---|---|---|---|---|---|---|---|
|  | SA-1 | SA-2 | SA-3 | N | Set-1 | Set-2 | Set-3 | S | P | 14HP |
| Example 3 | 100 | — | — | 500 | 8 | — | — | 100 | 14 | 3 |
| Comparative Example 2 | — | 100 | — | 500 | — | 4 | — | 100 | 14 | 3 |
| Example 4 | — | — | 100 | 500 | — | — | 8 | 100 | 14 | 3 |

Unit: Parts by mass 50 parts by mass of water was added to 100 parts by mass of each of the obtained rapid-hardening cement compositions, and the mixture was kneaded for 2 minutes with a hand mixer to prepare cement milk. Using the prepared cement milks, the respective physical properties of P funnel flow time, setting time, and compression strength were measured. The P funnel flow time was measured as follows. The setting time and the compression strength were measured by the methods described above.

The P funnel flow time was measured in accordance with the standard of Japan Society of Civil Engineers, JSCE-F 521 "Method of Fluidity Test of Injection Mortar for Pre-packed Concrete (Method by P funnel)".

In order to check temperature characteristics of the rapid-hardening cement compositions, the respective physical properties of the P funnel flow time, the setting time, and the compression strength were measured at environmental temperatures of 5° C., 20° C., and 35° C. The results are shown in Table 6.

Further, in order to check storage characteristics of the rapid-hardening cement compositions, the rapid-hardening cement compositions were stored in a room at a temperature of 30° C. and a humidity of 80% RH for 3 months and 6 months, respectively in the same manner as in Example 1. With respect to the rapid-hardening cement compositions after storage, cement milks were prepared, and the respective physical properties of the P funnel flow time, the setting time, and the compression strength were measured. The respective physical properties at this time were measured at an environmental temperature of 20° C. The results are shown in Table 7.

TABLE 6

| | Environmental temperature (° C.) | P funnel flow time (sec) | Setting time (min) | | Compression strength (N/mm$^2$) | | |
|---|---|---|---|---|---|---|---|
| | | | Initial | Finish | Age of 2 hours | Age of 3 hours | Age of 7 days |
| Example 3 | 5 | 11.3 | 48 | 59 | 4.5 | 7.8 | 25.8 |
| | 20 | 10.9 | 46 | 54 | 4.8 | 8.1 | 26.3 |
| | 35 | 10.6 | 45 | 51 | 5.1 | 8.3 | 27.8 |
| Comparative Example 2 | 5 | 12.1 | 63 | 80 | 1.0 | 4.5 | 24.2 |
| | 20 | 10.8 | 45 | 60 | 3.6 | 5.2 | 25.5 |
| | 35 | 9.6 | 36 | 52 | 4.2 | 6.7 | 25.8 |
| Example 4 | 5 | 10.5 | 47 | 56 | 5.0 | 8.4 | 26.0 |
| | 20 | 9.8 | 47 | 52 | 5.4 | 8.6 | 26.8 |
| | 35 | 9.6 | 45 | 49 | 5.4 | 9.0 | 27.4 |

TABLE 7

| | Storage period (month) | P funnel flow time (sec) | Setting time (min) | | Compression strength (N/mm$^2$) | | |
|---|---|---|---|---|---|---|---|
| | | | Initial | Finish | Age of 2 hours | Age of 3 hours | Age of 7 days |
| Example 3 | Immediately after production | 10.9 | 46 | 54 | 4.8 | 8.1 | 26.3 |
| | 3 | 10.7 | 48 | 56 | 4.8 | 8.0 | 26.5 |
| | 6 | 10.9 | 48 | 57 | 4.7 | 8.3 | 27.0 |
| Comparative Example 2 | Immediately after production | 10.8 | 45 | 60 | 3.6 | 5.2 | 25.5 |
| | 3 | 12.7 | 81 | 115 | Not available | 1.4 | 23.1 |
| | 6 | 13.4 | 120 or more | 180 or more | Not available | Not available | 12.2 |
| Example 4 | Immediately after production | 9.8 | 47 | 52 | 5.4 | 8.6 | 26.8 |
| | 3 | 9.6 | 48 | 53 | 5.3 | 8.8 | 27.4 |
| | 6 | 9.6 | 48 | 53 | 5.5 | 8.5 | 28.0 |

From the results shown in Table 6, it was confirmed that the rapid-hardening cement compositions of Examples 3 and 4 had small variations in the P funnel flow time, the setting time, and the compression strength due to an environmental temperature as compared with the rapid-hardening cement composition of Comparative Example 2, and thus were excellent in temperature stability. In particular, it was confirmed that the rapid-hardening cement composition of Example 4 containing sodium sulfate had a short P funnel flow time and excellent fluidity.

Further, from the results shown in Table 7, it was confirmed that the rapid-hardening cement compositions of Examples 3 and 4 had small variations in the P funnel flow time, the setting time, and the compression strength due to storage as compared with the rapid-hardening cement composition of Comparative Example 2, and thus were excellent in storage stability.

Examples 5 to 19

As the organic short fibers, PVA short fibers (fiber diameter: 26 μm, fiber length: 3 mm), polyamide short fibers (fiber diameter: 28 μm, fiber length: 3 mm), and aramid short fibers (fiber diameter: 12 μm, fiber length: 3 mm) were prepared. The short fibers were added to the rapid-hardening cement composition of Example 1 such that the amount of the short fibers with respect to the entire amount of the rapid-hardening cement composition was 0.05% by mass, 0.1% by mass, 0.5% by mass, 1.0% by mass, or 3.0% by mass, and mixed to prepare rapid-hardening cement compositions containing the short fibers.

50 parts by mass of water was added to 100 parts by mass of each of the obtained rapid-hardening cement compositions containing the short fibers, and the mixture was kneaded for 2 minutes with a hand mixer to prepare grout. Using the prepared grouts, JA funnel flow time was measured.

Further, for specimens manufactured using the obtained grouts, a repeated fatigue test of 2,000,000 times was performed. The fatigue test was carried out in accordance with the method based on the former JSTM C 7104: 1999 "Fatigue Test Method for Concrete by Repeated Compression Stress". A level of the fatigue test was set as a static compression strength of 50 N/mm$^2$, an upper limit stress ratio of 65%, a lower limit stress ratio of 10%, and a repetition rate of 10 Hz, and a dimension of the specimen was φ 50×100 mm.

The results are shown in Table 8.

TABLE 8

| Type of organic short fibers | Amount of fibers (% by mass) | JA funnel flow time (sec) | Condition of being destroyed in fatigue test |
|---|---|---|---|
| Example 5 | PVA fibers | 0.05 | 19.6 | Destroyed at 1,206,502 times |
| Example 6 | | 0.1 | 19.8 | Good at 2,000,000 times |
| Example 7 | | 0.5 | 21.2 | Good at 2,000,000 times |
| Example 8 | | 1 | 24.5 | Good at 2,000,000 times |
| Example 9 | | 3 | 35.5 | Good at 2,000,000 times |
| Example 10 | Nylon fibers | 0.05 | 19.5 | Destroyed at 965,290 times |
| Example 11 | | 0.1 | 19.7 | Good at 2,000,000 times |
| Example 12 | | 0.5 | 20.4 | Good at 2,000,000 times |
| Example 13 | | 1 | 25 | Good at 2,000,000 times |
| Example 14 | | 3 | 37.8 | Good at 2,000,000 times |
| Example 15 | Aramid fibers | 0.05 | 19.8 | Destroyed at 1,374,242 times |
| Example 16 | | 0.1 | 20.5 | Good at 2,000,000 times |
| Example 17 | | 0.5 | 23.1 | Good at 2,000,000 times |
| Example 18 | | 1 | 28.3 | Good at 2,000,000 times |
| Example 19 | | 3 | 40.7 | Good at 2,000,000 times |
| Example 1 | — | — | 19.8 | Destroyed at 19,854 times |

From the results shown in Table 8, it was confirmed that, in all cases where any short fibers of PVA short fibers, polyamide short fibers, and aramid short fibers were used, a compression fatigue durability of the specimen was greatly improved even in the case where an added amount of the short fibers was 0.05% by mass, and, in particular, the compression fatigue durability was remarkably improved in the case where an added amount of the short fibers was 0.1% by mass or more. Thus, it was confirmed that the specimen was in a good condition even in the case where the number of repetitions was 2,000,000 times, that is, addition of the short fibers greatly improved the compression fatigue durability of a hardened body.

Examples 20 to 24

A viscosity agent (WR) was added to the rapid-hardening cement composition of Example 1 such that the amount of the viscosity agent with respect to the entire amount of the rapid-hardening cement composition was 0.01% by mass, 0.05% by mass, 0.1% by mass, 0.5% by mass, or 1.0% by mass, and mixed to prepare rapid-hardening cement compositions containing the viscosity agent.

50 parts by mass of water was added to 100 parts by mass of each of the obtained rapid-hardening cement compositions containing the viscosity agent, and the mixture was kneaded for 2 minutes with a hand mixer to prepare grout. Using the prepared grouts, the JA funnel flow time and the bleeding rate after 2 hours were measured. In addition, the prepared grouts were hardened in water and in the air, and compression strengths of a hardened body collected in water and a hardened body collected in the air were measured.

Measurement of the bleeding rate, and collection of the hardened bodies in water and in the air were performed as follows.

The results are shown in Table 9.

(Bleeding Rate)

The bleeding rate was measured in accordance with the standard of Japan Society of Civil Engineers, JSCE-F 522 "Test Method of Bleeding Rate and Expansion Rate of Injection Mortar for Prepacked Concrete (Polyethylene Bag Method)".

(Method of Collecting Hardened Body in Water)

Figure 3:
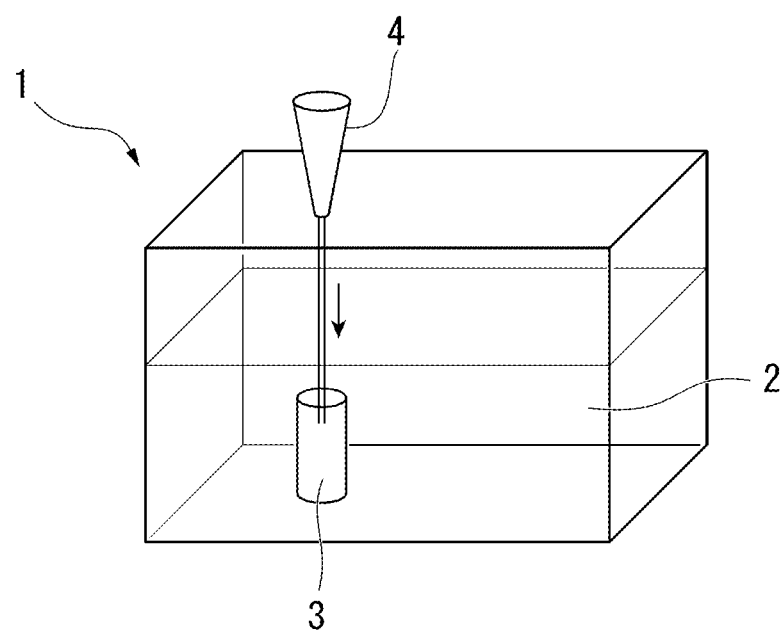
FIG. 3 is a perspective view of an apparatus for manufacturing a hardened body in water that was used in the examples.

FIG. 3 shows a perspective view of an apparatus for manufacturing a hardened body in water that was used in the present example.

First, a water tank 1 was filled with water 2. Next, a mold 3 was placed in water 2. As the mold 3, a cylindrical container having an inner diameter of φ50 and a height of 100 mm was used. Then, a rapid-hardening cement composition containing a viscosity agent was injected into the mold 3 using a funnel 4. After being allowed to stand for 2 hours from the injection, the mold 3 was taken out from the water 2, and a hardened body in the mold 3 was collected.

(Method of Collecting Hardened Body in Air)

The same method as the method of collecting a hardened body in water was carried out, except that the mold 3 was placed in the atmosphere, and the rapid-hardening cement composition containing the viscosity agent was injected into the mold 3 and allowed to stand for 2 hours.

TABLE 9

| | Added amount of WR (% by mass) | JA funnel flow time (sec) | Bleeding rate after 2 hours (%) | Compression strength at age of 2 hours (N/mm²) | | Ratio of case in water/case in air (%) |
| --- | --- | --- | --- | --- | --- | --- |
| | | | | In case of being collected in air | In case of being collected in water | |
| Example 20 | 0.01 | 20 | 0.25 | 12.3 | 9.9 | 80.5 |
| Example 21 | 0.05 | 21.5 | 0 | 12 | 11.4 | 95 |
| Example 22 | 0.1 | 23.3 | 0 | 12.4 | 12.2 | 98.4 |
| Example 23 | 0.5 | 27.8 | 0 | 12.3 | 12.1 | 98.4 |
| Example 24 | 1.0 | 45 | 0 | 12.2 | 12.1 | 99.2 |
| Example 1 | — | 19.8 | 0.75 | 11.8 | 0 | 0 |

From the results shown in Table 9, it was confirmed that by the addition of the viscosity agent, the bleeding rate was reduced and a hardened body having a high ratio of strength in water/strength in the air was obtained, that is, it was possible to form a hardened body having a high strength in water.

Examples 25 to 30

The powdered emulsion (P) was added to the rapid-hardening cement composition of Example 3 such that the amount of the powdered emulsion with respect to the entire amount of the rapid-hardening cement composition was 0.5% by mass, 1.0% by mass, 2.0% by mass, 5.0% by mass, 10.0% by mass, or 30.0% by mass, and mixed to produce rapid-hardening cement compositions containing the powdered emulsion.

45 parts by mass of water was added to 100 parts by mass of each of the obtained rapid-hardening cement compositions containing the powdered emulsion, and the mixture was kneaded for 2 minutes with a hand mixer to prepare cement milk. Using the prepared cement milks, the P funnel flow time, and compression strength at age of 7 days were measured. The results are shown in Table 10.

Further, each of the prepared cement milks was injected into an open-graded asphalt mixture (100×200×thickness of 100 mm) having a porosity of 22% and curing was carried out at a temperature of 20° C. for 7 days to manufacture a semi-flexible pavement body. The obtained semi-flexible pavement body was immersed in water. A freeze-thaw cycle of −20° C.×6 hours and +20° C.×6 hours was repeated for 200 cycles, and an appearance of the pavement body was observed. The results are shown in Table 10.

TABLE 10

| | Added amount of P (% by mass) | P funnel flow time (sec) | Compression strength at age of 7 days (N/mm²) | Condition of appearance due to freeze-thaw cycles | | | |
| --- | --- | --- | --- | --- | --- | --- | --- |
| | | | | 50 cycles | 100 cycles | 150 cycles | 200 cycles |
| Example 25 | 0.5 | 10.7 | 26.6 | Good | Good | Good | Scrape-off of injection material occurred |
| Example 26 | 1.0 | 10.9 | 25.8 | Good | Good | Good | Scrape-off of injection material occurred |
| Example 27 | 2.0 | 10.9 | 26.3 | Good | Good | Good | Good |
| Example 28 | 5.0 | 11.4 | 25.2 | Good | Good | Good | Good |
| Example 29 | 10.0 | 11.8 | 24.4 | Good | Good | Good | Good |
| Example 30 | 30.0 | 13.8 | 23.1 | Good | Good | Good | Good |
| Example 3 | — | 10.8 | 26 | Good | Scrape-off of injection material occurred | Scrape-off of injection material progressed | — |

From the results shown in Table 10, it was confirmed that a phenomenon in which a hardened body was scraped off due to repeated freezing-thawing was observed in a test piece in which the added amount of the powdered emulsion was less than 0.5% by mass. On the other hand, it was confirmed that in the case where the added amount of the powdered emulsion was 2.0% by mass or more, scrape-off of a hardened body was not observed, and the hardened body had improved freeze-thaw resistance due to addition of the powdered emulsion.

Examples 31 to 37

The rapid-hardening cement composition of Example 1, silica stone fine powder (SP), and limestone fine powder (LP) were mixed at blending amounts shown in Table 11, to produce rapid-hardening cement compositions containing an inorganic filler.

50 parts by mass of water was added to 100 parts by mass of each of the obtained rapid-hardening cement compositions containing the inorganic filler, and the mixture was kneaded for 2 minutes with a hand mixer to prepare cement milk. The obtained cement milk was injected into a cylindrical container having an inner diameter of ϕ50 and a height of 100 mm, and cured at room temperature for 7 days to manufacture a hardened body. Compression strength and a Young's modulus of each of the obtained hardened bodies at age of 7 days were measured. The Young's modulus was measured in accordance with JIS A 1149 "Test Method for Young's Modulus of Concrete". The results are shown in Table 11.

TABLE 11

| | Rapid-hardening cement composition (parts by mass) | SP (parts by mass) | LP (parts by mass) | Compression strength (age of 7 days) (N/mm$^2$) | Young's modulus (age of 7 days) (kN/mm$^2$) |
|---|---|---|---|---|---|
| Example 31 | 100 | 30 | — | 9.7 | 5.58 |
| Example 32 | 100 | 60 | — | 7.2 | 4.72 |
| Example 33 | 100 | 100 | — | 5.6 | 3.78 |
| Example 34 | 100 | — | 30 | 10.5 | 5.8 |
| Example 35 | 100 | — | 60 | 9.2 | 5.4 |
| Example 36 | 100 | — | 100 | 7.8 | 4.91 |
| Example 37 | 100 | 30 | 30 | 8.4 | 5.37 |
| Example 1 | 100 | 0 | 0 | 11.8 | 6.35 |

From the results shown in Table 11, it was confirmed that by adding the inorganic-based fine powder to the rapid-hardening cement composition, it was possible to control the compression strength and the Young's modulus to desired values.

Examples 38 to 42

An anti-freezing agent (CN) was added to the rapid-hardening cement composition of Example 3 such that the amount of the anti-freezing agent with respect to the entire amount of the rapid-hardening cement composition was 1.0% by mass, 2.0% by mass, 3.0% by mass, 5.0% by mass, or 10.0% by mass, and mixed to produce rapid-hardening cement compositions containing the anti-freezing agent.

45 parts by mass of water at a temperature of 5° C. was added to 100 parts by mass of each of the obtained rapid-hardening cement compositions containing the anti-freezing agent, and the mixture was kneaded for 2 minutes with a hand mixer under an environment of −5° C. to prepare grout.

Each of the obtained grouts was injected into three cylindrical containers (inner diameter of ϕ50×height of 100 mm), respectively. These three cylindrical containers were placed in an insulating container made of foamed styrol and having an inside dimension of 200 mm and 150×150 mm, and the grout was cured under an environment of −5° C. for 3 hours to manufacture a hardened body. The compression strength of each of the three hardened bodies of age of 3 hours was measured, and an average thereof was obtained. The results are shown in Table 12.

TABLE 12

| | Added amount of CN (% by mass) | Temperature (° C.) External air temperature | Temperature (° C.) Material temperature | Temperature (° C.) Water temperature | Temperature of mixed cement (grout) | Compression strength at age of 3 hours (N/mm$^2$) |
|---|---|---|---|---|---|---|
| Example 38 | 1.0 | −5 | −3.2 | 5.1 | 0.7 | 2.3 |
| Example 39 | 2.0 | −5 | −3.6 | 5.3 | 0.6 | 3.8 |
| Example 40 | 3.0 | −5 | −3.3 | 5.2 | 0.6 | 4.8 |
| Example 41 | 5.0 | −5 | −3.5 | 4.9 | 0.7 | 5.4 |
| Example 42 | 10.0 | −5 | −3.8 | 5.2 | 0.5 | 5 |
| Example 3 | — | −5 | −3.5 | 5.1 | 0.6 | Not measurable |

From the results shown in Table 12, it was confirmed that a hardened body could be generated from the rapid-hardening cement composition including the anti-freezing agent even under an environment of −5° C.

INDUSTRIAL APPLICABILITY

In the rapid-hardening cement composition of the present embodiment, variations in setting initial time due to an environmental temperature are small, and variations in setting initial time are small even after a long-term storage. In addition, fluidity is high during a period from addition of water until hardening reaction proceeds, and properties of early age strength are excellent. Therefore, the rapid-hardening cement composition of the present embodiment is suitably applied as an injection grout for pavement which is a raw material for a hack-filling grout material used for PC pavement and RC pavement, cement milk used for semi-flexible pavement, and the like.

REFERENCE SIGNS LIST

1: water tank
2: water
3: mold
4: funnel

The invention claimed is:

1. A rapid-hardening cement composition, comprising:
a rapid-hardening admixture; and
a cement in an amount of 100 to 2,000 parts by mass with respect to 100 parts by mass of the rapid-hardening admixture,
wherein the rapid-hardening admixture comprises: a calcium aluminate; an anhydrite in an amount of 50 to 200 parts by mass with respect to 100 parts by mass of the calcium aluminate; and a first setting modifier in an amount of 0.1 to 10 parts by mass with respect to 100 parts by mass of the calcium aluminate, and
wherein an average particle diameter of the calcium aluminate is in a range of 8 to 100 μm, and an average particle diameter of the first setting modifier is in a range of 5 μm or less.

2. The composition of claim 1, wherein the first setting modifier comprises a compound selected from the group consisting of an inorganic carbonate, an oxycarboxylic acid, a sodium aluminate, and a sodium sulfate.

3. The composition of claim 1, further comprising:
a second setting modifier, added such that a total amount of the first and second setting modifier with respect to an entire amount of the rapid-hardening cement composition is in a range of 0.01% to 5% by mass.

4. The composition of claim 3, wherein the second setting modifier, as added, is a setting modifier-comprising mixture comprising:
(i) an inorganic powder and
(ii) the second setting modifier in an amount of 50 to 300 parts by mass with respect to 100 parts by mass of the inorganic powder,
wherein the inorganic powder is one or more selected from the group consisting of a cement, a limestone powder, a silica stone powder, a blast furnace slag powder, a coal ash, a fly ash, a clay mineral, and a calcium aluminate powder, and
wherein the second setting modifier comprises a compound selected from the group consisting of an inorganic carbonate, an oxycarboxylic acid, a sodium aluminate, and a sodium sulfate.

5. The composition of claim 1, further comprising:
short fibers that consist of organic short fibers and/or carbon short fibers are further included in an amount of 0.1% to 0.3% by mass with respect to an entire amount of the rapid-hardening cement composition.

6. The composition of claim 1, further comprising:
a viscosity agent in an amount of 0.1% to 1% by mass with respect to an entire amount of the rapid-hardening cement composition.

7. The composition of claim 1, further comprising:
a powdered emulsion in an amount of 0.5% to 30% by mass with respect to an entire amount of the rapid-hardening cement composition.

8. The composition of claim 1, further comprising:
an inorganic filler that consists of one or more selected from the group consisting of a silica stone fine powder, a limestone fine powder, a coal ash fine powder, a fly ash, a montmorillonite fine powder, a feldspar fine powder, and a blast furnace slag fine powder, in an amount of 4% to 50% by mass with respect to an entire amount of the rapid-hardening cement composition.

9. The composition of claim 1, further comprising:
an anti-freezing agent that consists of one or more selected from the group consisting of a sodium acetate, a calcium acetate, and a calcium nitrite, in an amount of 1% to 10% by mass with respect to an entire amount of the rapid-hardening cement composition.

10. The composition of claim 1, further comprising:
organic fibers and/or carbon fibers in an amount of 0.1% to 0.3% by mass with respect to an entire amount of the rapid-hardening cement composition.

11. The composition of claim 1, further comprising:
an inorganic filler comprising silica stone fine powder, a limestone fine powder, a coal ash fine powder, a fly ash, a montmorillonite fine powder, a feldspar fine powder, and/or a blast furnace slag fine powder, in an amount of 4% to 50% by mass with respect to an entire amount of the rapid-hardening cement composition.

12. The composition of claim 1, further comprising:
an anti-freezing agent comprising a sodium acetate, a calcium acetate, a calcium nitrite, or a mixture of two or more of any of these, in an amount of 1% to 10% by mass with respect to an entire amount of the rapid-hardening cement composition.

13. The composition of claim 1, wherein the first setting modifier comprises an inorganic carbonate, an oxycarboxylic acid, a sodium aluminate, a sodium sulfate, or a mixture of two or more of any of these.

14. The composition of claim 3, wherein the second setting modifier, as added, is a setting modifier-comprising mixture comprising:
(i) an inorganic powder and
(ii) the second setting modifier in an amount of 50 to 300 parts by mass with respect to 100 parts by mass of the inorganic powder,
wherein the inorganic powder comprises a cement, limestone powder, silica stone powder, blast furnace slag powder, coal ash, fly ash, clay mineral, calcium aluminate powder, or a mixture of two or more of any of these, and
wherein the second setting modifier comprises an inorganic carbonate, oxycarboxylic acid, sodium aluminate, or sodium sulfate.

15. The composition of claim 1, wherein the anhydrite comprises a type II anhydrite.

16. The composition of claim 1, wherein the calcium aluminate has a vitrification rate of 80% or more.

17. The composition of claim 1, wherein the calcium aluminate has a Blaine specific surface area in a range of from 3,000 to 5,500 cm$^2$/g.

18. The composition of claim 5, wherein the short fibers have a fiber length in a range of 1 mm to 10 mm.

19. The composition of claim 1, wherein the first setting modifier comprises an inorganic carbonate.

20. An injection grout, comprising the composition of claim 1.

* * * * *